POTENTIOMETER LOADING ERROR COMPENSATION

Filed Feb. 10, 1960 2 Sheets-Sheet 1

INVENTOR
MORTON LOSHER
BY
ATTORNEY

INVENTOR
MORTON LOSHER

BY

ATTORNEY

United States Patent Office 3,066,251

Patented Nov. 27, 1962

3,066,251

POTENTIOMETER LOADING ERROR COMPENSATION

Morton Losher, Bergenfield, N.J., assignor, by mesne assignments to the United States of America as represented by the Secretary of the Navy Filed Feb. 10, 1960, Ser. No. 7,953

10 Claims. (Cl. 323—79)

The present invention relates to error compensation in electrical circuits and more particularly to compensation for errors caused by potentiometer loading.

In analog computers, potentiometers are often used for multiplying and in function generator applications. These potentiometers are generally calibrated in accordance with the fraction of total potentiometer resistance across which the output voltage is measured. Resistance may also be calibrated under given load conditions. However it will be realized that in situations where the load resistance on the wiper arm is not constant, any load resistance which is different from that used in calibration will cause the original calibration to be in error. Particularly in the case of motor-driven variable coefficient potentiometers, it has been very difficult to apply loading corrections to reduce those errors. Obviously the accuracy of the computer will be adversely affected if the error cannot be compensated for.

The present invention provides for reduction of these errors by adding to the potentiometer output a voltage, the magnitude of which is substantially equal to the error produced but which is opposite in sign. The correction is automatically varied as the error varies.

It is thus an object of the present invention to provide compensation for potentiometer loading errors.

Another object is the provision of increased accuracy in analog computers by compensation for potentiometer loading errors.

Other objects and many of the attendant advantages of this invention will be readily appreciated as the same becomes better understood by reference to the following detailed description when considered in connection with the accompanying drawings wherein.

Figure 1:
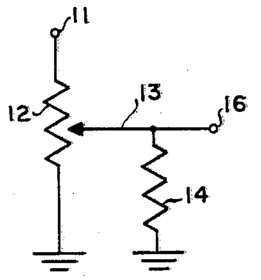
FIG. 1 is a circuit diagram of a conventional potentiometer with a load on the wiper arm.

Referring now to the drawings there is shown diagrammatically in FIG. 1, a potentiometer having an input terminal 11 connected through resistance coil 12 to ground. An input voltage is applied to terminal 11 and the desired output is tapped from resistance coil 12 by movement of wiper arm 13. Wiper arm 13 has a load resistor 14 connected thereto and to ground and the output voltage is taken across the load resistor 14 at terminal 16. It will be realized that with a constant load resistance, a constant input voltage, and a constant setting of wiper arm 13 on coil 12, the voltage at the output terminal 16 will also be constant. However if any one of these quantities is varied the output voltage will also vary.

Assuming the resistance of coil 12 to be linear with distance and a constant resistance load 14, as the wiper arm 13 is moved across the coil the output voltage will vary in a non-linear manner. Letting coil resistance

12=$R_p$, load resistance 14=$R_L$, input voltage to terminal 11=$e_i$, output voltage at terminal 16=$e_o$, and letting X=the fraction of the length of coil 12 between the wiper arm 13 and ground and $(1-X)$=the remaining fraction of the wiper arm, it is found that the ratio of output voltage to input voltage, $$\frac{e_o}{e_i}=\frac{XR_L}{R_L+R_pX(1-X)}=\frac{X}{1+\frac{RX}{R_L}(1-X)}$$

With no load in the output ($R_L=\infty$), this ratio becomes:

$$\frac{e_o}{e_i}=X$$

The potentiometer loading error may be defined as the loaded output minus the unloaded output:

$$\left.\frac{e_o}{e_i}\right]_{ld}-\left.\frac{e_o}{e_i}\right]_{unld}=\frac{e_{er}}{e_i}=\frac{X}{1+\frac{R_p}{R_L}(1-X)}-X=\frac{-\frac{R_p}{R_L}X^2(1-X)}{1+\frac{R_p}{R_L}X(1-X)}$$

Figure 2:
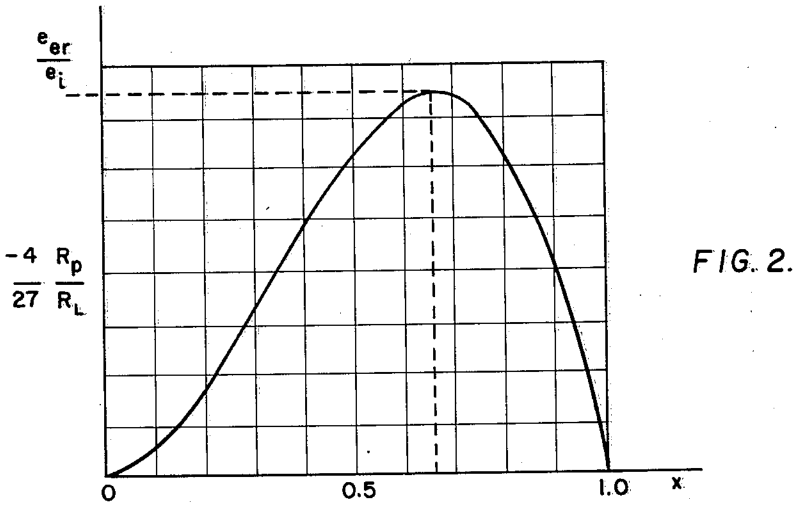
FIG. 2 is a curve of the ratio of error voltage to input voltage plotted as a function of distance along the potentiometer coil showing potentiometer loading error of the type of circuit illustrated in FIG. 1.

This ratio is plotted in FIG. 2, assuming $R_L$ greater than $R_p$. It can be seen from the figure that the error is zero when the coil is tapped at either end and that the maximum ratio of error voltage to input voltage is dependent on the relative resistance of the coil as compared to that of the load. As the load resistance approaches infinity, the error approaches zero. Thus if the load can be made to look infinite to the potentiometer, the error will become zero.

Figure 1A:
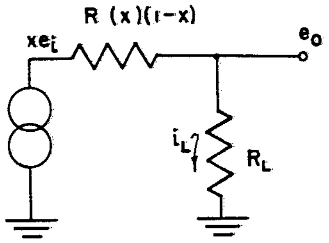
FIG. 1A is an equivalent circuit of FIG. 1.
Figure 3:
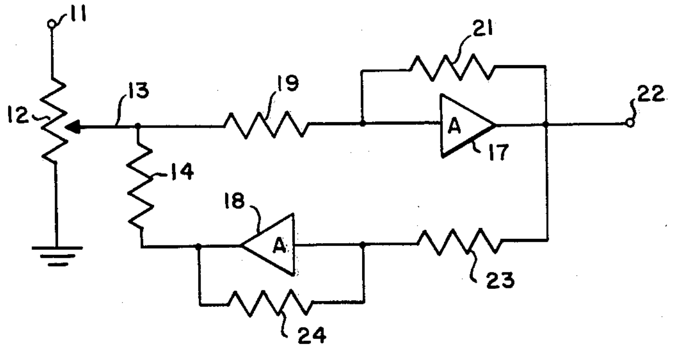
FIG. 3 is a circuit diagram of an embodiment of this invention.

According to the present invention this is accomplished by the circuit shown in FIG. 3. As shown in FIG. 1A which is an equivalent circuit diagram of FIG. 1 using the values set forth above it is seen that a loading current $i_L$ is drawn by $R_L$. From the figure it is seen that $$i_L=\frac{Xe_i}{R_L+R_pX(1-X)}$$

If $i_L$ could be made equal to zero, $e_o$ would equal $Xe_i$ since there would be no IR drop across $R_pX(1-X)$ and a current $$\frac{Xe_i}{R_L}$$

would flow in $R_L$.

This is accomplished by the circuit of FIG. 3 wherein a pair of feedback type high gain operational amplifiers 17, 18 are utilized in a positive feedback circuit. The linear potentiometer of FIG. 1 including input terminal 11, resistance coil 12, wiper arm 13 and a load resistance 14, has connected to wiper arm 13 a resistance 19 of equal value to that of load resistor 14. Connected to resistor 19 is a high gain operational amplifier 17 having a feedback resistor 21 shunted thereacross. The resistance value of feedback resistor 21 is again equal to that of load resistor 14. At the output of amplifier 17 are connected an output terminal 22 and a feedback loop including resistor 23, of resistance value equal to that of load resistor 14, connected to amplifier 18 having a feedback resistor 24 of resistance value equal to twice that of load resistor 14. The output of amplifier 18 is fed through load resistor 14 to the wiper arm 13.

Thus the voltage on wiper arm 13, assuming X as the fraction of potentiometer resistance 12 between wiper arm and ground and further applying an input voltage of $e_i$, will be equal to $Xe_i$. To satisfy the condition that no current flows through the wiper arm, the current in the feedback loop through load resistance 14 equal to $R_L$ must be equal to $$\frac{Xe_i}{R_L}$$

Therefore the voltage at the output of amplifier 18 must be $2Xe_1$ and the output voltage at terminal 22 will be $-Xe_1$ and thus varies continuously linearly with X giving zero error.

Hence the potentiometer seems to look into an infinite load resistance and the corrective action is seen to be independent of the potentiometer resistance. This circuit however is limited by the fact that positive feedback is involved and the loop gain must be kept less than unity to prevent regeneration. Since the loop gain would just equal unity if potentiometer resistance $R_p$ were infinite, there is little chance of trouble where $R_L$ is made greater than $R_p$.

Figure 4:
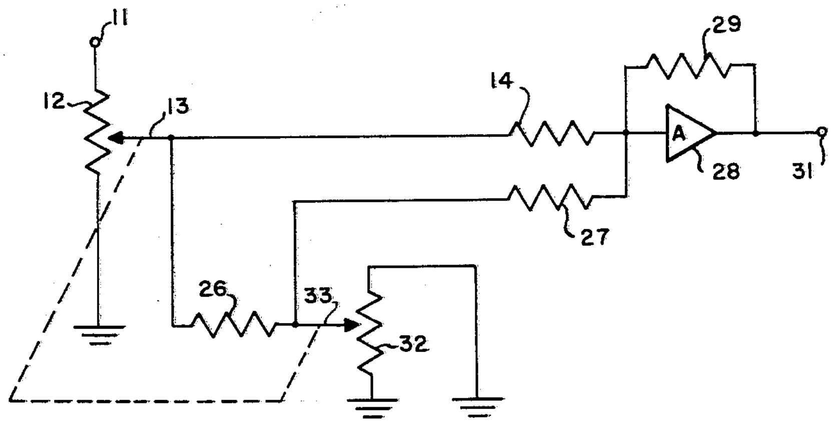
FIG. 4 is a circuit diagram of a second embodiment of the invention.
Figure 4A:
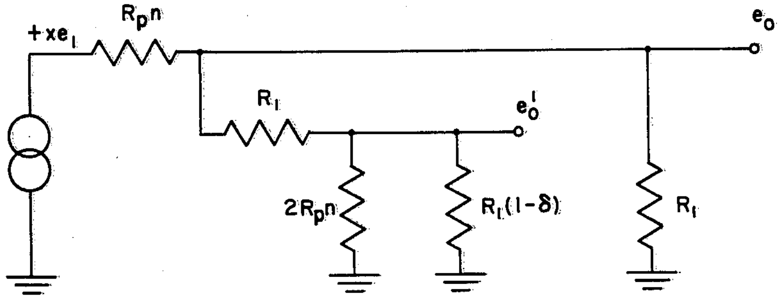
FIG. 4A is an equivalent circuit of FIG. 4.

FIG. 4 shows a second embodiment of the invention. This embodiment combines a voltage similar functionally but opposite in sign with the original potentiometer voltage by use of a second linear potentiometer ganged with the first.

As shown in FIG. 4, the potentiometer having input terminal 11, resistance coil 12 and wiper arm 13 is connected to load resistor 14 having a resistance $R_L$. A second resistor 26 also having resistance $R_L$ is connected to wiper arm 13 and also to the wiper arm 33, ganged with wiper arm 33, of a second potentiometer having a resistance coil 32 which has a resistance $2R_p$ equal to twice the resistance of coil 12. Resistance coil 32 is grounded at both ends and acts as a voltage divider. Wiper arm 33 of the second potentiometer is also connected through a resistor 27 to the output of load resistance 14 and thence to the input of a feedback type high gain operational amplifier 28 having a feedback resistor 29 with a resistance equal to that of load resistor 14. The amplifier output is supplied to output terminal 31 of the circuit. Resistor 27 has a value equal to $R_L(1-\delta)$, where $\delta$ is a small positive number designed to provide the signal voltage at wiper arm 33 with a slightly higher amplification than that at wiper arm 13. Again, amplifier 28 may be any type feedback amplifier having high gain.

The operation of the circuit is as follows with reference to equivalent circuit 4A. Let $R_L=R_1$, the load on the potentiometer having resistance $R_p$ is $R_1/2$; let $n$, for simplicity, $=X(1-X)$ where X and $1-X$ are fractions as indicated in discussion of FIG. 1A, and the corrected output voltage $$|e_c|=e_o+e_o'\frac{1}{1-\delta}$$

then $$\frac{|e_c|}{e_1}=\frac{+X\left[1-\delta+2\frac{R_p}{R_1}(3-\delta)n\right]}{1-\delta+2\frac{R_p}{R_1}(3-2\delta)n+2\left(\frac{R_p}{R_1}\right)^2(3-\delta)n^2}$$

The deviation of this expression from perfect linearity is $$\frac{|e_c|}{e_1}-X=\frac{-X\left[2\left(\frac{R_p}{R_1}\right)^2(3-\delta)n^2-2\frac{R_p}{R_1}\delta n\right]}{1-\delta+2\frac{R_p}{R_1}(3-2\delta)n+2\left(\frac{R_p}{R_1}\right)^2(3-\delta)n^2}$$

Since $\delta$ is much less than 1, $R_p/R_1$ much less than 1, and $n/\text{max}=0.25$, $$\frac{|e_c|}{e_1}-X$$

is approximately equal to $$-2\frac{R_p}{R_1}Xn\left[3\frac{R_p}{R_1}n-\delta\right]$$

thus the error becomes 0 for $X=0$, $n=0$, and $$\left[3\frac{R_p}{R_1}n-\delta\right]=0$$

Since $n=X(1-X)$, $n=0$ for $X=0$ and $X=1$. Further since the error is 0 when $$\left[3\frac{R_p}{R_1}n-\delta\right]=0, n=\frac{R_1}{3R_p}\delta$$

Thus if $\delta$ is chosen so that $n=0.21$, the error becomes zero for $X=0.3$ and 0.7.

In an actual circuit wherein $$\frac{R_p}{R_L}=1/30$$

and $\delta$ was chosen as $=0.021$, the maximum deviation from zero error became approximately 0.005% at X is approximately equal to 0.9. Without the compensating circuit and with $$\frac{R_p}{R_L}=1/30$$

the maximum error would have been $4/27\times1/30\times100\%$ which is approximately equal to 0.5% at $X=0.67$. Hence the improvement was on the order of 100 to 1.

Thus there have been described two embodiments of a device for reducing potentiometer loading error. These devices inherently add to the overall accuracy of analog computer systems when used therein and by their use, potentiometers of higher resistance can be used with smaller values of summing resistors resulting in higher voltage sensitivities and reduced noise and leakage problems. The systems are relatively inexpensive and once designed for a particular application need no special adjustments.

It will be realized by those skilled in the art that the above described circuits will be operative with any type of linear potentiometers and resistors having the relative values described herein. It will also be realized that since the amplifiers are of the feedback type, various types of amplifiers having sufficient gain may be employed. It is well known that in feedback amplifiers having a large feedback factor, the amplification is substantially independent of the characteristics of the amplifier itself.

Obviously many modifications and variations of the present invention are possible in the light of the above teachings. It is therefore to be understood that within the scope of the appended claims the invention may be practiced otherwise than is specifically described.

What is claimed is:

1. A system for compensating for calibration errors due to loading a potentiometer wiper arm comprising means for deriving an error signal similar functionally but opposite in sign to the voltage on the wiper arm and means for adding said error signal to the voltage on said wiper arm.

2. A system for compensating for calibration errors due to loading a linear potentiometer wiper arm comprising means for deriving an error signal similar functionally to the voltage on the wiper arm and means for adding the error signal in opposition to the voltage on said wiper arm.

3. A self compensating linear potentiometer comprising an input terminal, a resistance coil, a wiper arm contacting said resistance coil and adapted to be moved thereover, a load resistance connected to said wiper arm, a second resistor connected to said wiper arm, said resistor having a resistance equal to that of said load resistance and being also connected to the input of a high gain feedback type amplifier having a feedback resistor; said feedback resistor having a resistance equal to that of said load resistor; the output of said amplifier being connected to an output terminal and also through a third resistance equal to that of said load resistance to the input of a second high gain feedback type amplifier, said second amplifier having a feedback resistor having a resistance equal to twice that of said load resistance, said load resistance being connected between the output of said second amplifier and said wiper arm whereby when a voltage is applied to the input terminal the voltage at the output terminal varies linearly with the distance which said wiper arm is moved along said resistance coil.

4. The invention as defined in claim 1 wherein said means for deriving an error signal similar functionally but opposite in sign to the voltage on said wiper arm include a second potentiometer having a wiper arm ganged with said first named wiper arm, first resistance means interconnecting said wiper arms, said second potentiometer having both ends of its resistance coil connected to like potential; and a second resistance means connected in series with said first resistance means; and wherein said means for adding said error signal to the voltage on said first named wiper arm includes the connection of said resistance means in series across said load, the compensated output voltage being derived from the end of said load opposite said first named wiper arm when said first potentiometer is connected to a source of voltage.

5. The invention as defined in claim 4 wherein the ends of the second potentiometer resistance coil are connected to ground potential.

6. The invention as defined in claim 4 wherein the compensated output voltage is passed through a high gain feedback type amplifier to an output terminal.

7. The invention as defined in claim 6 wherein the ends of the second potentiometer resistance coil are connected to ground potential.

8. The invention as defined in claim 7 wherein said first resistance means has a resistance equal to that of said load, said second resistance means has a resistance equal to that of said load.

9. A system for compensating for calibration errors due to loading a linear potentiometer wiper arm, comprising a load resistor connected to said wiper arm, a second resistor having one end connected to said wiper arm and having its other end connected to the input of a first high gain feedback type amplifier having a feedback resistor, an output terminal connected to the output of said first amplifier and also connected to the input of a second high gain feedback type amplifier having a feedback resistor, said load resistor being connected between the output of said second amplifier and said wiper arm whereby when a voltage is applied to the potentiometer the voltage at the output terminal varies linearly with the distance which said wiper arm is moved along said resistance coil.

10. A system for compensating for calibration errors due to loading a potentiometer wiper arm comprising means for reducing the current in said wiper arm effectively to zero, said means including a first path comprising resistance means and a first high gain feedback type amplifier connecting said wiper arm to an output terminal, and positive feedback means including a second high gain feedback type amplifier for feeding back a portion of the signal at the output terminal to said wiper arm.

References Cited in the file of this patent

UNITED STATES PATENTS

| | | |
|---|---|---|
| 2,760,147 | Couanault | Aug. 21, 1956 |
| 2,840,309 | Hunt | June 24, 1958 |
| 2,949,233 | Fogarty | Aug. 16, 1960 |